Patented Apr. 5, 1932 1,852,178

UNITED STATES PATENT OFFICE

DARWIN R. MAY, OF WILKINSBURG, PENNSYLVANIA, ASSIGNOR TO WESTINGHOUSE ELECTRIC & MANUFACTURING COMPANY, A CORPORATION OF PENNSYLVANIA

POLYHYDRIC ALCOHOL-POLYBASIC ACID SYNTHETIC RESIN

No Drawing.   Application filed November 19, 1927. Serial No. 234,561.

My invention relates to a novel process of producing synthetic resins and articles molded therefrom, and more particularly to a process of producing resins of the type that are formed by the condensation of polyhydric alcohols and polybasic acids.

An object of my invention is to provide a process of producing dense, infusible compact resins from the condensation of polyhydric alcohols and polybasic acids by means of which the polymerization of the condensation products from an intermediate, fusible state to a final, infusible and insoluble resin, is uniformly effected in a relatively short period of time.

Another object of my invention is to provide a process of effectively producing a final, infusible, resin with excellent physical properties, from the fusible, resinous product resulting from the condensation of a polyhydric alcohol and a polybasic acid at a much higher temperature and, therefore, in a much shorter time than has heretofore been considered possible.

A further object of my invention is to provide a process of producing molded articles which consists, essentially, in mixing suitable fillers with a powdered, fusible, partially polymerized condensation product of glycerol and phthalic anhydride, or with the initial components from which the powdered condensation product is produced, and then completing the polymerization at a high temperature to form a dense, composite article that is free from cavities and imperfections.

When two molecular parts, by weight, of glycerol and three molecular parts, by weight, of phthalic anhydride are heated together at a temperature between 185 and 210° C., a chemical reaction takes place which is indicated by bubbling and loss of water. After the reaction has proceeded for several hours, the mixture begins to thicken and then suddenly changes into a viscous, porous, resinous mass. Before this sudden change in physical properties, the product is known as "stage A" material and is soluble in acetone and slightly soluble in water. After the change, the material is no longer fusible, although it softens on heating, and its solubility in water, acetone and glycerol is considerably decreased. The material, at this point, may be designated as "stage B" material, and, while resinous in nature, is generally unsuitable for molding material to be utilized in electrical apparatus because of its brittleness and hygroscopic nature. Continued heating changes "stage B" material into "stage C" material, which is a resin, infusible and insoluble in the ordinary solvents, but moldable at unusually high temperatures, when placed under pressure.

It has heretofore been the practice to interrupt the reaction between the initial components of the resin in its intermediate stage, or before the final product became infusible, and dissolve the partially polymerized resin thus produced in a solvent, or mix it with fillers ordinarily utilized in molded products. The partially polymerized resin was then converted, under the influence of heat, into its final, infusible state. In order to obtain a substantially clear, compact, infusible resin, great care must be exercised in converting stage B material into stage C material. One portion may harden before the other portion is completely polymerized and, when the polymerization is conducted at a high temperature, sudden ebullition sets in because of which a hard, infusible mass is obtained that is filled with cavities and imperfections. It has, therefore, been the practice, in obtaining the final, infusible product, to heat the fusible, intermediate material at a low temperature for a long period of time. This time-consuming process requiring days and sometimes weeks, has made the production of resins and products molded from resins of this type commercially impracticable.

I have made the discovery that the condensation products of glycerol and phthalic anhydride may be completely and uniformly polymerized at a high temperature and that a properly cured resin having excellent physical properties may be obtained in a much shorter period of time, than has previously been considered possible.

In practicing my invention, glycerol and phthalic anhydride are mixed together in the proportion of two molecular parts, by weight, of glycerol and three molecular parts, by weight, of phthalic anhydride and heated together, as fast as practicable, to the thickening stage. While the resin is in the thick, viscous stage, but before it has gelatinized, it is poured from the reaction vessel and allowed to cool.

The material is then finely ground, and the polymerization of the pulverulent particles is continued at a temperature of about 100° C. in an oven, which is preferably designed so that it may be rotated during the process, although any other suitable means may be provided for agitating the material. The oven may be externally heated or, if preferred, the pulverulent particles may be maintained at the desired temperature by exposing them directly to a current of a hot gas, such as air or nitrogen. The oven should be provided with a flue or other suitable means to permit the escape of water vapor or any of the uncombined ingredients which have not entered into the reaction, and such means will also serve to permit the egress of the gas when the pulverulent particles are directly heated.

After heating the material at the temperature specified for a certain length of time, say from two to twelve hours, the temperature is raised as rapidly as practicable to about 200° to 225° C. and maintained at this temperature until the product is completely polymerized. This will usually require between four and six hours. The material is then removed from the oven as a completely cured resin in a finely powdered state. The finely divided particles may be molded together, under pressure, at a temperature of about 285° C. and, in a few minutes, are converted into a substantially clear, light amber-colored resin.

It will be understood that the time and temperature of heating may be varied within a wide range, and, therefore, I do not desire to be limited in this respect. When a high temperature is maintained, the time for complete polymerization of the particles will be correspondingly decreased, but care must be exercised to prevent the particles from sintering together.

Any desirable filler, such as mica, asbestos, wood fiber or ground materials, may be added to the initial components of the resin, or they may be added to the powdered resin on hot rolls before heat treatment and, after the resin particles have been completely polymerized, the resulting mixture is subsequently molded under heat and pressure in the manner described for the production of the resin.

The resins and molded products produced by my novel method are tough and strong, and are superior in dielectric qualities to phenolic condensation products. They are practically infusible and insoluble in ordinary solvents, such as acetone, benzene and alcohol, but may be decomposed by hot alkalies, forming the corresponding alkali phthalate and glycerol.

My process is not limited to the production of a completely polymerized resin from glycerol and phthalic anhydride, and to molded material produced therefrom, but is also utilizable for the production of completely polymerized resins and molded products from glycerol and other dibasic acids, such as citric, succinic, malic, tartaric, maleic or fumaric acids, from glycerol and a mixture of phthalic anhydride and any one of the above mentioned diabasic acids, or from glycerol and a mixture of phthalic anhydride and a monobasic acid, such a butyric, stearic, oleic, ricinoleic or a resin acid.

In the production of resins of this type, various other polyhydric alcohols, such as glycol, its homologues, or polyglycols, such as diethylene or triethylene glycol, may be substituted for glycerol, and the process which I have described is also utilizable for completely polymerizing such resins.

It will also be understood that, if desired, a suitable plasticizer, such as diethyl, dibutyl or diamyl phthalate may be added to the initial components of the resin, to the partially polymerized resin, or to a mixture of the resin and filler, and the polymerization of the resin completed in the manner specified.

Other modifications will become apparent to those skilled in the art and I desire, therefore, that only such limitations shall be placed upon my invention as are imposed by the prior art and the appended claims.

I claim as my invention:

1. The process of producing a synthetic resin which comprises heating a mixture containing a polyhydric alcohol and a polybasic acid until a viscous mass is obtained which solidifies, upon cooling, into a partially polymerized resin, cooling the viscous mass, pulverizing the partially polymerized resin and then heating the pulverized particles to continue the polymerization of the resin while the particles are being agitated.

2. The process of producing a synthetic resin which comprises heating a mixture containing glycerol and phthalic anhydride until a viscous mass is obtained which solidifies, upon cooling, into a partially polymerized resin, cooling the viscous mass, pulverizing the partially polymerized resin and then heating the particles to continue the polymerization of the resin while the particles are being agitated.

3. The process of producing a synthetic resin which comprises heating a mixture containing a polyhydric alcohol and a polybasic acid until a viscous mass is obtained which solidifies, upon cooling, into a partially polymerized resin, cooling the viscous mass, pulverizing the partially polymerized resin and then heating the pulverized particles to continue the polymerization of the resin, with agitation, until the particles have been rendered infusible.

4. The process of producing a synthetic resin which comprises heating a mixture containing glycerol and phthalic anhydride until a viscous mass is obtained which solidifies, upon cooling, into a partially polymerized resin, cooling the viscous mass, pulverizing the partially polymerized resin and then heating the pulverized particles to continue the polymerization of the resin, with agitation, until the particles have been rendered infusible.

5. The process of producing a synthetic resin which comprises heating a mixture containing a polyhydric alcohol and a polybasic acid until a viscous mass is obtained which solidifies, upon cooling, into a partially polymerized resin, cooling the viscous mass, pulverizing the partially polymerized resin, heating the polymerized particles in a rotating oven, at a temperature of about 100° C., for from two to twelve hours and then continuing the heating in said rotating oven, at a higher temperature, until the pulverized particles are completely polymerized.

6. The process of producing a synthetic resin which comprises heating a mixture containing glycerol and phthalic anhydride until a viscous mass is obtained which solidifies, upon cooling, into a partially polymerized resin, cooling the viscous mass, pulverizing the partially polymerized particles, heating the pulverized particles in a rotating oven, at a temperature of about 100° C., for from two to twelve hours and then continuing the heating in said rotating oven, at a higher temperature, until the pulverized particles are completely polymerized.

7. In the process of producing an infusible, synthetic resin from the condensation of a mixture containing a polyhydric alcohol and a polybasic acid, the steps which comprise pulverizing the fusible resin produced by the partial polymerization of the reaction product, and then heating the pulverized particles to continue the polymerization of the resin while the particles are being agitated.

8. The process of producing an infusible, insoluble resin from the brittle, fusible resin produced by the partial polymerization of a mixture containing a polyhydric alcohol and a polybasic acid which comprises pulverizing the fusible resin and continuing the polymerization in a rotating oven, at a temperature of 100° C., for a period of from two to twelve hours and then completing the polymerization, at a temperature of about 225° C., for a period of between four and six hours.

9. The process of producing a synthetic resin which comprises heating a mixture of glycerol a polybasic and a monobasic acid until a viscous mass is obtained which solidifies upon cooling into a partially polymerized resin, cooling the viscous mass, pulverizing the partially polymerized resin and continuing the polymerization while agitating the particles.

In testimony whereof, I have hereunto subscribed my name this 12th day of November 1927.

DARWIN R. MAY.